US009904877B2

(12) United States Patent
Yoshiwaka et al.

(10) Patent No.: US 9,904,877 B2
(45) Date of Patent: Feb. 27, 2018

(54) PRINTING APPARATUS CONFIGURED TO PRINT SEPARATE PRINT JOBS CONCURRENTLY

(71) Applicant: SEIKO EPSON CORPORATION, Tokyo (JP)

(72) Inventors: Hirofumi Yoshiwaka, Shiojiri (JP); Toshiaki Isobe, Azumino (JP); Mamiko Ishida, Shiojiri (JP); Mamoru Akatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/666,462

(22) Filed: Mar. 24, 2015

(65) Prior Publication Data
US 2015/0278649 A1 Oct. 1, 2015

(30) Foreign Application Priority Data
Mar. 25, 2014 (JP) ................................ 2014-061386

(51) Int. Cl.
*G06K 15/02* (2006.01)
*G06K 15/10* (2006.01)
(Continued)

(52) U.S. Cl.
CPC ............ *G06K 15/16* (2013.01); *B41J 11/008* (2013.01); *B41J 15/22* (2013.01); *G06K 15/1803* (2013.01)

(58) Field of Classification Search
CPC ..... B41J 3/42; B41J 3/4075; B41J 3/62; B41J 11/50; B41J 11/51; B41J 11/52; B41J 11/48; B41J 15/046; B41J 15/18; B41J 15/22; B41J 15/24; B41J 11/008; B41J 15/08; G06K 15/021; G06K 15/022; G06K 15/024; G06K 15/1806; G06K 15/1809; G06K 15/1822; G06K 15/1818;
(Continued)

(56) References Cited

U.S. PATENT DOCUMENTS 6,042,228 A * 3/2000 Yamada .................. B41J 2/01
347/104
6,181,434 B1 * 1/2001 Matsumoto ............ B65G 1/133
358/1.13
(Continued)

FOREIGN PATENT DOCUMENTS

JP 2001-270177 10/2001
JP 2001/270177 10/2001

OTHER PUBLICATIONS

European Search Report for Application No. 15160488.1 dated Aug. 18, 2015.

*Primary Examiner* — Hai Phan
*Assistant Examiner* — Jonathan R Beckley
(74) *Attorney, Agent, or Firm* — Workman Nydegger

(57) ABSTRACT

A printing apparatus includes: a transport unit that arranges and is able to transport a plurality of continuous paper pieces in parallel; a printing unit of which a print head reciprocates in a direction intersecting with a transport direction of the plurality of continuous paper pieces and which is configured to be able to perform printing on the plurality of continuous paper pieces separately; a reception unit that is able to receive a plurality of print jobs; and a control unit that controls operations of the transport unit and the printing unit based on the plurality of print jobs received by the reception unit.

11 Claims, 4 Drawing Sheets

(51) Int. Cl.
*G06K 15/16* (2006.01)
*B41J 11/00* (2006.01)
*B41J 15/22* (2006.01)

(58) Field of Classification Search
CPC ........... G06K 15/1823; G06K 15/1857; G06K 15/1898; G06K 15/16; G06K 15/1803; G06K 15/1868; G06K 15/186; G06K 15/1801; H04N 1/00657; H04N 1/00665; B65H 2301/231; B65H 2220/02; B65H 2220/03; B65H 2220/11; B65H 2301/23; G06F 3/1251; G06F 3/124; G06F 3/1242; G06F 3/126; G06F 3/1262; G06F 3/1215
See application file for complete search history.

(56) References Cited

U.S. PATENT DOCUMENTS

| | | | |
|---|---|---|---|
| RE38,092 E * | 4/2003 | Yamada | B41J 2/01 242/530.4 |
| 6,773,180 B2 * | 8/2004 | Tsuji | B41J 11/007 400/605 |
| 6,825,943 B1 * | 11/2004 | Barry | G06K 15/1857 358/1.1 |
| 7,277,114 B2 * | 10/2007 | Konagaya | G03B 27/588 347/262 |
| 7,468,802 B1 * | 12/2008 | Johnson | G06F 3/1215 358/1.15 |
| 8,390,872 B2 * | 3/2013 | Abe | G06F 3/1219 358/1.18 |
| 8,472,035 B2 * | 6/2013 | Nakamaru | G06K 15/022 101/2 |
| 8,777,399 B2 * | 7/2014 | Mo | B41J 11/008 347/104 |
| 8,810,849 B2 * | 8/2014 | Matsuhashi | B41J 3/4075 358/1.1 |
| 9,195,920 B2 * | 11/2015 | Johnson | G06K 15/1836 |
| 2004/0141021 A1 * | 7/2004 | Yamamoto | B41J 11/0065 347/16 |
| 2004/0174421 A1 | 9/2004 | Tsuji | |
| 2007/0263244 A1 * | 11/2007 | Sugitani | B41J 3/543 358/1.15 |
| 2011/0069329 A1 * | 3/2011 | Abe | G06F 3/1219 358/1.9 |
| 2012/0081726 A1 * | 4/2012 | Nakamaru | G06K 15/022 358/1.12 |

* cited by examiner

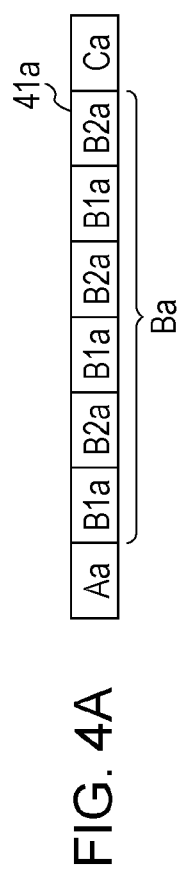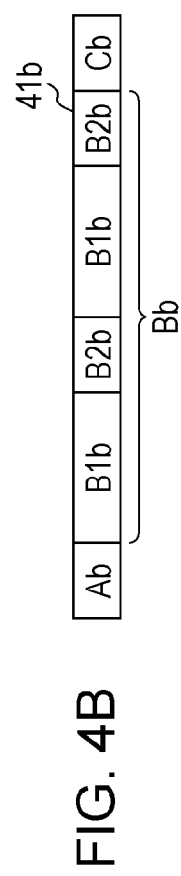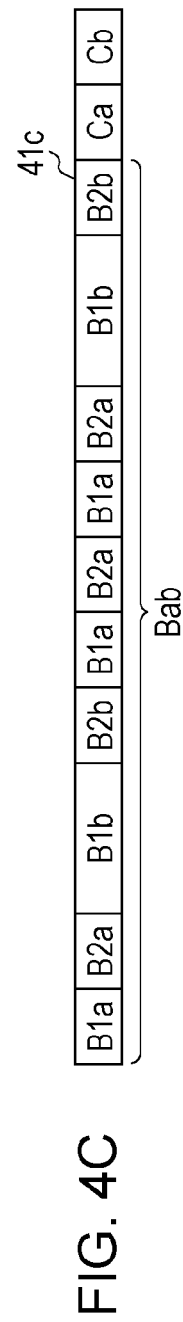

PRINTING APPARATUS CONFIGURED TO PRINT SEPARATE PRINT JOBS CONCURRENTLY

BACKGROUND

1. Technical Field

The present invention relates to a printing apparatus such as an ink jet-type printer.

2. Related Art

In the related art, as a type of a printing apparatus, an ink jet-type printer has been known, in which ink as an example of a liquid is ejected from a print head that moves in a direction orthogonal to a transport direction of a medium, onto the medium such as a long continuous paper transported in a predetermined direction and which performs printing. In addition, as the printer, a printer is proposed in which, in order to shorten a total printing time, a plurality of media are arranged and transported in parallel and the same or different printing is performed on the plurality of media through one reciprocating movement of the print head (for example, see JP-A-2001-270177).

However, in the printer described above, a single host computer is connected to an interface unit. In a case where a plurality of print jobs are received from the computer, the print jobs are analyzed into print commands containing print data in the order of receiving and the plurality of print commands obtained from the analyzing are sequentially stored in a band memory based on control of a control unit.

That is, in the printer described above, in a case where a plurality of print jobs are received, analysis work of the print jobs into the print commands is not configured to be performed concurrently in parallel from the plurality of print jobs. Therefore, in a case where a plurality of print jobs are received, time consumed for analysis of the print jobs into the print commands is not shortened and thus, there is a problem in that it is not possible to shorten a total printing time.

SUMMARY

An advantage of some aspects of the invention is to provide a printing apparatus in which, in a case where printing based on a plurality of print jobs separately received is performed on a plurality of media concurrently in parallel, it is possible to shorten a total printing time.

Hereinafter, means of the invention and operation effects thereof will be described.

According to an aspect of the invention, there is provided a printing apparatus including: a transport unit that is able to arrange and to transport a plurality of media in parallel; a printing unit that is configured to be able to reciprocate in a direction intersecting with a transport direction of the plurality of media and to perform printing on the plurality of media separately; a reception unit that is able to receive a plurality of print jobs; and a control unit that integrates and analyzes the plurality of print jobs received by the reception unit such that a print command is produced corresponding to scanning over the plurality of media at least once by the printing unit and controls operations of the transport unit and the printing unit based on the print command.

According to the configuration, for example, in a case where the plurality of print jobs are concurrently received by the reception unit, the plurality of print jobs are integrated and analyzed by the control unit. As an analysis result, the print command is produced corresponding to scanning at least once over the plurality of media by the printing unit. Therefore, time for analyzing the plurality of print jobs received by the reception unit into the print command is different from time for sequentially analyzing print jobs one by one in the related art and thus, it is possible to shorten time because the plurality of print jobs are integrated and analyzed. Hence, it is possible to shorten a total printing time taken for a case where printing is concurrently performed on the plurality of media in parallel based on the plurality of separately received print jobs.

In the printing apparatus, it is preferable that the reception unit has a plurality of ports that are able to independently receive the print job and the control unit has analysis units that are able to analyze the print job into the print command, corresponding to the plurality of ports, and a job management unit that is able to integrate analysis results by a plurality of the analysis units corresponding to the ports, respectively, and to produce a print command corresponding to scanning at least once.

According to the configuration, for example, in a state in which a plurality of computers are independently connected to the plurality of ports of the reception unit and in a case where the plurality of print jobs are received via corresponding ports from the computers, the print jobs are concurrently analyzed in parallel in the analysis units corresponding to the ports, respectively. The analysis results from the analysis units is integrated by the job management unit and configures the print command corresponding to scanning at least once which is possible to perform concurrently the printing on the plurality of media in parallel. Hence, since the plurality of print jobs are concurrently received in parallel via the plurality of ports and are concurrently analyzed in parallel by the plurality of analysis unit, it is possible to simply shorten the total printing time by increasing the number of ports and analysis units.

In the printing apparatus, it is preferable that the print command includes print data representing print content for each of the plurality of media and line-break data associated with the print data and the control unit controls operations of the transport unit and the printing unit such that printing is performed on a medium positioned on a side closer to a print standby position, of the plurality of media, in a movement direction of the printing unit, based on print data which has more line breaks by the line-break data associated with the print data of the plurality of items of print data.

At the time of printing, in a case where the printing unit is caused to move to a position facing a medium on a side far from the print standby position passing a medium on a side close to the print standby position, then is caused to repeatedly perform printing operations on the medium on the far side a plurality of times by line breaks, and then, is caused to return to the print standby position, the time taken for passing the medium on the side close to the print standby position is not used for printing and thus, is a wasted time.

According to the configuration, since the printing is performed on the medium on the side close to the print standby position based on the print data which includes more line breaks without passing the medium on the side close to the print standby position by moving a relatively short distance, there is no wasted passing time so that the printing is completed within a shorter time by an equivalent time. Hence, the configuration contributes to shortening the total printing time taken for a case where the printing is concurrently performed on the plurality of media in parallel based on the plurality of print jobs.

In the printing apparatus, it is preferable that a flushing reception unit that is able to contain a liquid discharged for emitting from the printing unit is provided at a position between two adjacent transport paths of the media on the movement path of the printing unit.

According to the configuration, in a case where, in order to maintain good liquid ejection characteristics in the printing unit, a so-called flushing which causes the liquid to be discharged not for printing but for emitting is performed during the printing operation, it is possible for the printing unit to rapidly move to a position facing the flushing reception unit without moving a useless distance.

In the printing apparatus, it is preferable that the print job includes a plurality of items of information including identification information of the medium, and the control unit controls operations of the transport unit and the printing unit such that printing is performed on a medium which is identified by the identification information of the medium of the plurality of media based on a print job including the identification information of the medium.

According to the configuration, in a case where, glossy paper and common paper are transported in parallel when, according to the identification information of the medium, a print job which performs printing of a picture, for example, on glossy paper is received, the control unit controls the transport unit and the printing unit such that the printing is performed on the glossy paper based on the print job. Thus, according to the identification information of the medium, since it is possible to perform the printing as desired, it is possible to prevent re-printing due to failure of the printing and it is possible to contribute to shortening the total printing time.

BRIEF DESCRIPTION OF THE DRAWINGS

The invention will be described with reference to the accompanying drawings, wherein like numbers reference like elements.

FIGS. 4A to 4C are views schematically illustrating print commands, FIG. 4A is a diagram schematically illustrating a print command of one print job, FIG. 4B is a diagram schematically illustrating a print command of another print job, FIG. 4C is a diagram schematically illustrating a print command when the two print jobs are integrated.

DESCRIPTION OF EXEMPLARY EMBODIMENTS

Hereinafter, an embodiment of a printing apparatus will be described with reference to the drawings. The printing apparatus according to the present embodiment is configured of, for example, an ink jet-type printer which ejects ink as an example of a liquid onto a medium and performs printing. In addition, the printer has a printing method in which the print head is caused to move in a direction intersecting with a transport direction of the medium and performs the printing.

Figure 1:
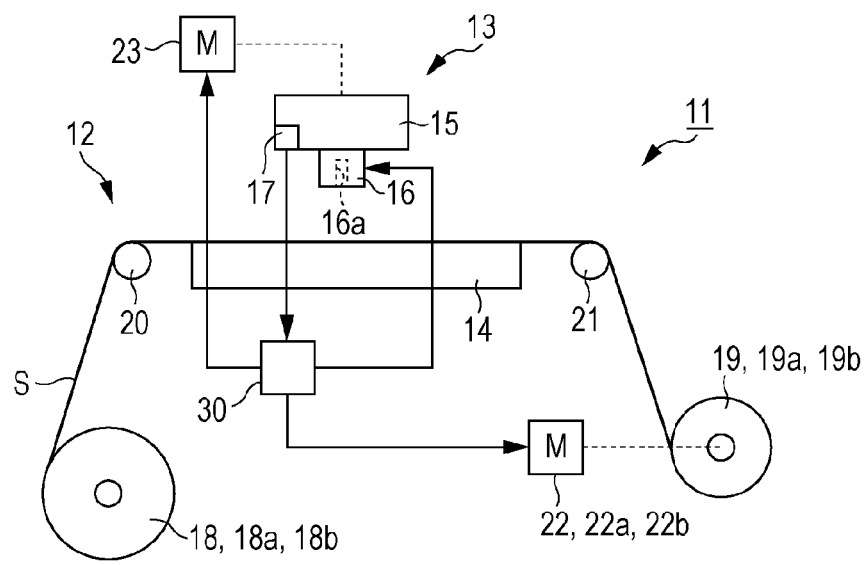
FIG. 1 is a front view schematically illustrating a printing apparatus of an embodiment.

As illustrated in FIG. 1, a printing apparatus 11 includes a transport path 12 that can transport a long-shaped continuous paper piece S which is an example of a medium, and a printing unit 13 that reciprocates in a width direction (direction orthogonal to the paper surface in FIG. 1) of the continuous paper S intersecting with the transport direction of the continuous paper piece S by the transport path 12 and that ejects ink onto the continuous paper piece S. The transport path 12 has a support 14 which can transport the continuous paper piece S which faces the printing unit 13 in a state of being horizontal, at a position facing the printing unit 13 in a vertical direction.

The printing unit 13 has a moving body 15 that can reciprocate in an upper region of the support 14 along the width direction of the continuous paper piece S, and has a print head 16 that can eject ink towards a region of the continuous paper piece S which is supported by the support 14, on the undersurface side of the moving body 15. The print head 16 ejects the ink from a nozzle 16a that opens on the undersurface thereof. Incidentally, in FIG. 1, only one nozzle 16a in the print head 16 is illustrated; however, many nozzles 16a are provided so as to form a plurality of nozzle rows extending along a direction orthogonal to the movement direction of the print head 16. In addition, the printing unit 13 has an optical sensor 17 such as a reflective photo sensor in a part of the moving body 15. The sensor 17 detects whether or not the continuous paper piece S which is the medium is present at a position facing the print head 16 and outputs detection result thereof as a detection signal.

As illustrated in FIG. 1, in the transport path 12, a roll shaft 18 extending in the width direction of the continuous paper piece S is rotatably provided at a position on the upstream side (left side in FIG. 1) from the support 14 in the transport direction of the continuous paper piece S. On the roll shaft 18, the continuous paper piece S is rotatably supported integrally with the axial center of the roll shaft 18 as a rotating center in a shape of a roll body wound in a roll shape in advance. On the other hand, in the transport path 12, a winding shaft 19 extending in the width direction of the continuous paper piece S is rotatably provided at a position on the downstream side (right side in FIG. 1) from the support 14 in the transport direction of the continuous paper piece S. The leading edge portion of the continuous paper piece S as the end portion on the downstream side in the transport direction is wound on the winding shaft 19.

In addition, between the roll shaft 18 and the support 14 in the transport path 12, a relay roller 20 that loops and guides the continuous paper piece S unwound from the roll shaft 18 to the support 14 is rotatably provided with an axial line extending in the width direction of the continuous paper piece S as the rotating center. In addition, between the support 14 and the winding shaft 19 in the transport path 12, a relay roller 21 that loops and guides the continuous paper piece S which has passed over the support 14 to the downstream side in the transport direction to the winding shaft 19 is rotatably provided with an axial line extending in the width direction of the continuous paper piece S as the rotating center.

As illustrated in FIG. 1, a PF motor 22 which is a motor for transport is connected to the winding shaft 19 to rotate and a CR motor 23 which is a motor for a movement is connected to the moving body 15 to rotate. Following the rotation and drive of the PF motor 22, the winding shaft 19 rotates in the winding direction (counterclockwise direction in FIG. 1) and thereby, the continuous paper piece S is unwound from the roll shaft 18 and is transported to the downstream side. In addition, following the rotation and drive of the CR motor 23, the moving body 15 moves in a scanning direction orthogonal to the transport direction of the continuous paper piece S and thereby, the print head 16 can perform printing operation by ejecting ink onto the continuous paper piece S.

Figure 2:
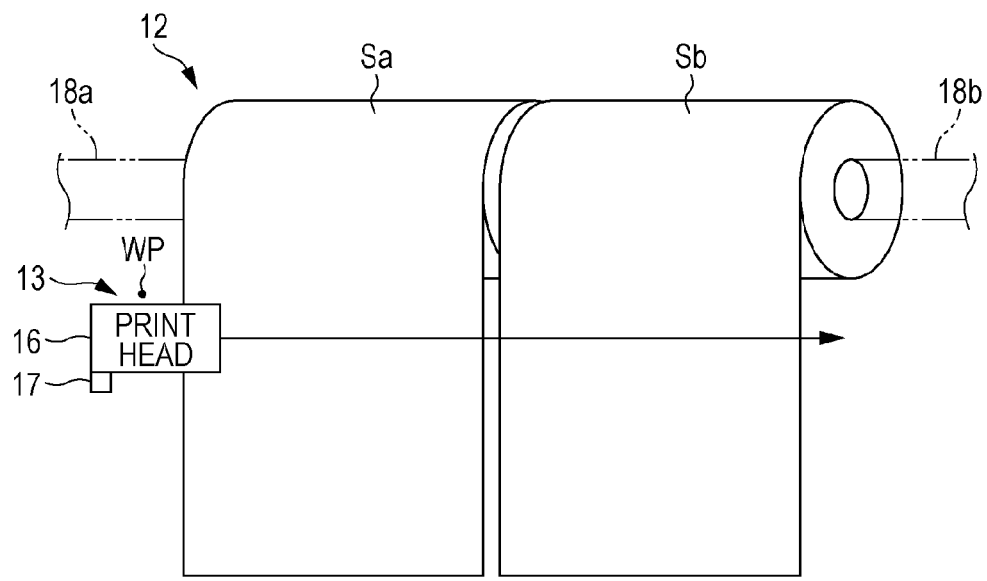
FIG. 2 is a view schematically illustrating a printing operation on a plurality of continuous paper pieces by a print head.

Here, as illustrated in FIG. 2, the transport path 12 can arrange and transport a plurality of (two as an example of) continuous paper pieces S in parallel. That is, as illustrated in FIG. 1 and FIG. 2, in the transport path 12, the roll shaft 18 is configured to have a first roll shaft 18a and the second roll shaft 18b which can independently rotate in a coaxial disposition and the winding shaft 19 is configured to have a first winding shaft 19a and the second winding shaft 19b which can independently rotate in a coaxial disposition. In addition, the PF motor 22 which is the transporting motor is configured to have a first PF motor 22a and a second PF motor 22b which can be rotatably driven independently.

Of the roll shafts 18a and 18b and the winding shafts 19a an 19b, the first roll shaft 18a and the first winding shaft 19a are disposed on a side close to a print standby position WP (left end position in FIG. 2) at which the print head 16 halts during print standby or the like in the movement direction and the second roll shaft 18b and the second winding shaft 19b are disposed on a side far from the print standby position WP. In addition, of the PF motor 22a and 22b, the first PF motor 22a is connected to the first winding shaft 19a on the side close to the print standby position WP to be driven, and the second PF motor 22b is connected to the second winding shaft 19b on the side far from the print standby position WP to be driven.

A first continuous paper piece Sa is looped over between the first roll shaft 18a and the first winding shaft 19a on the side close to the print standby position WP and a second continuous paper piece Sb is looped over between the second roll shaft 18b and the second winding shaft 19b on the side far from the print standby position WP. Incidentally, in a case of the present embodiment, the first continuous paper piece Sa and the second continuous paper piece Sb have the same width size along the movement direction of the print head 16; however, the first continuous paper piece Sa is common paper in types of paper and the second continuous paper piece Sb is glossy paper. That is, the second continuous paper piece Sb on the side far from the print standby position WP is configured of glossy paper preferably used in a case where photo printing, highly-accurate printing, or the like is performed.

In addition, illustrated in FIG. 1, the printer 11 has a control unit 30 that controls rotating states of the PF motor 22a and PF motor 22b for transport and the CR motor 23 for a movement and ejecting state of ink from the print head 16. The control unit 30 is configured to a microcomputer that has a CPU, a ROM, a RAM, a nonvolatile memory, and the like. The control unit 30 controls to rotate the PF motors 22a and 22b such that the continuous paper pieces Sa and Sb are arranged and transported and the moving body 15 moves in a direction orthogonal to the transport direction such that the ink is ejected onto the continuous paper pieces Sa and Sb from the print head 16.

Next, the control unit 30 in the printer 11 will be described.

Figure 3:
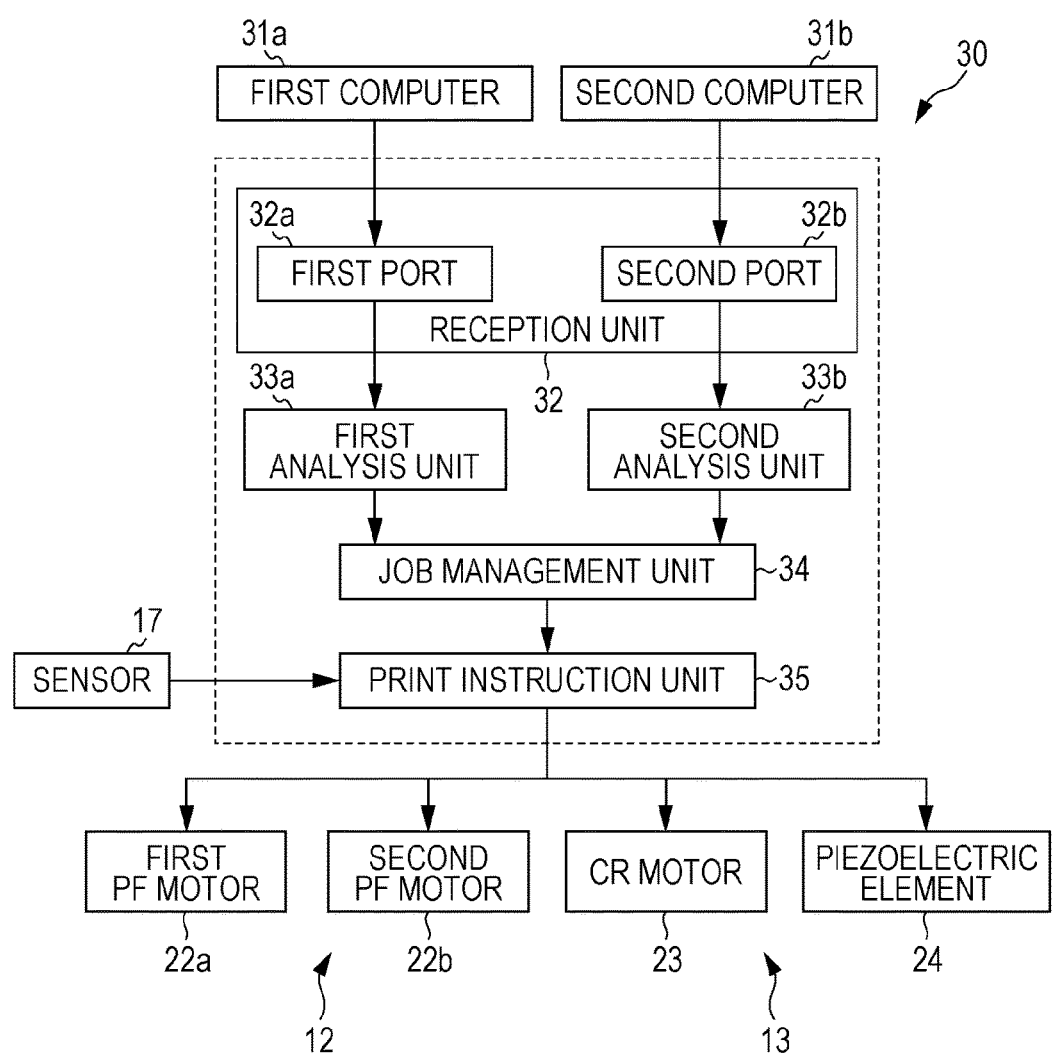
FIG. 3 is a block diagram illustrating a control configuration in the printing apparatus.

As illustrated in FIG. 3, the control unit 30 includes a reception unit 32 that can receive a print job transmitted from the outside. The reception unit 32 in the present embodiment has a first port 32a and a second port 32b as a plurality of ports which can independently receive a plurality of print jobs. A first computer 31a as a terminal that can transmit the print job from the outside is connected to the first port 32a and a second computer 31b as a terminal that can transmit the print job from the outside is connected to the second port 32b.

In addition, the control unit 30 has a plurality of analysis units which can analyze the plurality of print jobs received by the reception unit 32 from the computers 31a and 31b into print commands including predetermined data, corresponding to the plurality of ports 32a and 32b. That is, the control unit 30 has a first analysis unit 33a that analyzes the print job (hereinafter, referred to as a "first print job") received by the reception unit 32 via the first port 32a and a second analysis unit 33b that analyzes the print job (hereinafter, referred to as a "second print job") received via the second port 32b.

In addition, the control unit 30 includes a job management unit 34 in which the plurality of print commands output from the analysis units 33a and 33b are input. The job management unit 34 integrates a print command (hereinafter, referred to as a "first print command") input from the first analysis unit 33a and a print command (hereinafter, referred to as a "second print command") input from the second analysis unit 33b, and produces a print command corresponding to scanning, at least once by the print head 16, on the continuous paper pieces Sa and Sb which are transported in parallel. Hereinafter, the print command corresponding to scanning at least once which is produced by integrating a plurality of print commands by the job management unit 34 is referred to as an integrated print command.

The integrated print command produced by the job management unit 34 is also sent to a print instruction unit 35 which is included in the control unit 30. In addition, a detection signal from the sensor 17, along with the print head 16, provided in the moving body 15 is input to the print instruction unit 35. The print instruction unit 35 controls rotating states of the PF motors 22a and 22b or CR motor 23 and a voltage applied to the piezoelectric element 24 which is driven when ink is ejected by the print head 16 in accordance with the detection signal from the sensor 17 and the integrated print command from the job management unit 34. In the printing control of the printer 11, the control content is defined by the integrated print command produced by the job management unit 34.

Next, the print command in the printer 11 will be described.

First, the print command which is analyzed for printing from a print job in the analysis units 33a and 33b is configured to include a print setting command, a print control command, and a print ending command. Of the commands, the print setting command includes various items of information such as a type, a width size of the medium (continuous paper pieces Sa and Sb) which becomes a target of printing in a case where ink is ejected from the print head 16 and printing is performed, a print start position in the scanning direction by the print head 16, the number of print pages, the number of print copies, or a cut setting.

Among the various items of information included in the print setting command, information representing, for example, a type or a width size of the medium is used as identification information which makes it possible to identify which medium of the plurality of media transported in parallel is a target on which printing is performed based on the print job. For example, in a case of a print job of performing photo printing, the print setting command image information the print command analyzed from the print job includes, as the identification information, information indicating that the medium which is glossy paper suitable for the photo printing is the medium of the printing target.

In addition, the print control command represents the print content by the print job and includes print data representing a print image formed on the medium by ejection of ink from the print head 16 and line-break data which defines a line-break position in the movement direction of the print head 16 at the time of the printing. Further, the print ending command is a command of ending the printing operation on the medium by the print head 16. Hereinafter, contents of the print command output from the analysis units 33a and 33b and the integrated print command produced in the job management unit 34 will be described.

First, as illustrated in FIG. 4A, a first print command 41a analyzed from the first print job by the first analysis unit 33a is configured to include a first print setting command Aa, a first print control command Ba produced of a first print data B1a and a first line-break data B2a, and a first print ending command Ca. The first print control command Ba in the first print command 41a has a configuration in which combination between the first print data B1a and the first line-break data B2a are performed three times. That is, it is indicated that the first print control command Ba in the first print command 41a is produced by repeating a first printing operation three times by the print head 16 in which a print image by the first print job is configured by combination of the first print data B1a and the first line-break data B2a. In addition, in this case, the first print setting command Aa includes, as identification information of the medium, information indicating that the first continuous paper piece Sa which is common paper of A4 width size is the medium of the printing target.

As illustrated in FIG. 4B, a second print command 41b analyzed from a second print job by the second analysis unit 33b is configured to include a second print setting command Ab, a second print control command Bb produced of a second print data B1b and a second line-break data B2b, and a second print ending command Cb. The second print control command Bb in the second print command 41b has a configuration in which combination between the second print data B1b and the second line-break data B2b are performed twice. That is, it is indicated that the second print control command Bb in the second print command 41b is produced by repeating the second printing operation twice by the print head 16 in which a print image by the second print job is configured by combination of the second print data B1b and the second line-break data B2b. In addition, in this case, the second print setting command Ab includes, as identification information of the medium, information indicating that the second continuous paper piece Sb which is glossy paper of A4 width size is the medium of the printing target.

As illustrated in FIG. 4C, the integrated print command 41c produced by integrating the first print command 41a and the second print command 41b by the job management unit 34 is configured to include the first print control command Ba and the first print ending command Ca in the first print command 41a and the second print control command Bb and the second print ending command Cb in the second print command 41b. That is, the integrated print command 41c defines a print job corresponding to scanning once by the print head 16 which reciprocates in the scanning direction and performs a printing operation. The job management unit 34 holds the first print setting command Aa in the first print command 41a and the second print setting command Ab in the second print command 41b as another print setting parameter different from the integrated print command 41c and sends the first print setting command Aa and the second print setting command Ab with the integrated print command 41c to the print instruction unit 35.

In addition, an integrated print control command Bab in the integrated print command 41c is configured to combine, first, the first print data B1a and the first line-break data B2a in the first print command 41a and to continue combining, next, the second print data B1b and the second line-break data B2b in the second print command 41b. In the configuration, the second print data B1b and the second line-break data B2b are combined, then, the first print data B1a and the first line-break data B2a are combined repeatedly twice, and then, finally, the second print data B1b and the second line-break data B2b are combined.

The print setting commands Aa and Ab are not included in the integrated print command 41c. However, as described above, the first print setting command Aa corresponding to the first print control command Ba in the first print command 41a and the second print setting command Ab corresponding to the second print control command Bb in the second print command 41b as the print setting parameter are sent to the print instruction unit 35 with the integrated print command 41c. Therefore, the first printing operation based on the combination of the first print data B1a and the first line-break data B2a in the integrated print command 41c is performed on the first continuous paper piece Sa defined by the first print setting command Aa. The second printing operation based on the combination of the second print data B1b and the second line-break data B2b is performed on the second continuous paper piece Sb defined by the second print setting command Ab.

Next, description is provided focusing on effects of a case where the reception unit 32 receives a plurality of print jobs of the effects of the printer 11 of the present embodiment.

In the printer 11, when the first print job is transmitted to the reception unit 32 from the first computer 31a, the first print job is received via the first port 32a. In addition, when the second print job is transmitted to the reception unit 32 from the second computer 31b, the second print job is received via the second port 32b. That is, the first port 32a and the second port 32b receive the print jobs independently.

The first print job received via the first port 32a is analyzed in the first analysis unit 33a into the first print command 41a. In addition, the second print job received via the second port 32b is analyzed in the second analysis unit 33b into the second print command 41b. That is, the first print job and the second print job are subjected to analysis concurrently in parallel from the print jobs into the print commands via the independently receiving ports 32a and 32b in individually corresponding analysis units 33a and 33b. That is, there is no waiting time between the analysis of one print job and the analysis of the next print job, and a plurality of print jobs are concurrently analyzed in parallel into the print commands.

Next, the first print command 41a and the second print command 41b are integrated and then, the integrated print command 41c is produced by the job management unit 34. In this case, the job management unit 34 determines the first continuous paper piece Sa on the side close to the print standby position WP to be the printing medium of the first print job, based on the first print setting command Aa included in the first print command 41a and the second print setting command Ab included in the second print command 41b and then, determines the second continuous paper piece Sb on the side far from the print standby position WP to be the printing medium of the second print job.

In this case, the first print setting command Aa corresponding to the first print command 41*a* includes, as identification information, information indicating that the medium of the printing target is the common paper. That is, the first printing operation based on the first print job analyzed into the first print command 41*a* needs to be performed on the first continuous paper piece Sa which is the common paper. Therefore, the job management unit 34 produces the integrated print command 41*c* or sets the order of data items of the command information such that the combination of the first print data B1*a* and the first line-break data B2*a* in the first print command 41*a* is first read.

Next, as print setting parameters, the first print setting command Aa and the second print setting command Ab and the integrated print command 41*c* for printing are sent to the print instruction unit 35 from the job management unit 34. Then, the print instruction unit 35 controls the drive state of the motors 22*a*, 22*b*, and 23 and the voltage applied to the piezoelectric element 24 based on the command information and then, the printing operations on the continuous paper pieces Sa and Sb are started. In this case, the print instruction unit 35 determines whether or not the position of the moving body 15, on which the print head 16 is mounted, on the movement path is over the transport path of the continuous paper pieces Sa and Sb, based on the detection signal from the sensor 17.

Figure 5:
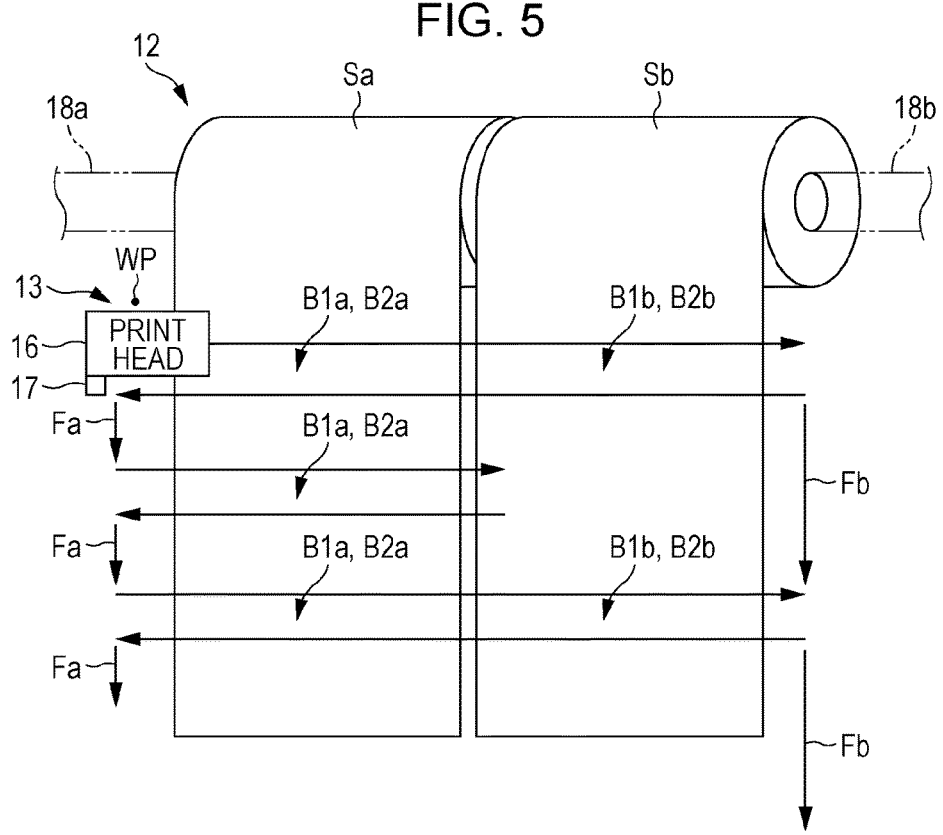
FIG. 5 a diagram schematically illustrating the printing operation on the plurality of continuous paper pieces based on the plurality of print jobs.

FIG. 5 illustrates a state of the print head 16 immediately after performing the reciprocating movement three times in a direction orthogonal to the transport path of the continuous paper pieces Sa and Sb from the print standby position WP. As illustrated in FIG. 5, when the printing operation is started following the drive of the CR motor 23 and the print head 16 starts the movement corresponding to the first reciprocating movement (first, forward movement), the first-time first printing operation is performed on the first continuous paper piece Sa based on the combination of the first print data B1*a* and the first line-break data B2*a* which is read in the first in the integrated print command 41*c*. Then, the print head 16 continues the forward movement and the first-time second printing operation is performed on the second continuous paper piece Sb based on the combination of the second print data B1*b* and the second line-break data B2*b* which is read in the second in the integrated print command 41*c*. That is, the print head 16 that reciprocates in the scanning direction makes a movement corresponding to scanning once (in this case, forward movement) based on the integrated print command 41*c* and thereby, the printing operation is concurrently performed in parallel on the first continuous paper piece Sa and the second continuous paper piece Sb which are transported in parallel.

When the first-time second printing operation on the second continuous paper piece Sb is completed, the print head 16 performs a homeward movement which is a movement in a direction opposite to the forward movement and returns to a position on the movement path of the moving body 15 at which the previous forward movement is started. That is, the printing operations on the continuous paper pieces Sa and Sb are completed by the first one reciprocating movement. Next, the print instruction unit 35 controls drive of the PF motors 22*a* and 22*b* based on information such as the number of printing pages included in the print setting commands Aa and Ab and then, the continuous paper pieces Sa and Sb are transported downstream by a predetermined feed amounts Fa and Fb.

Next, the print head 16 starts a second reciprocating movement and the second-time first printing operation is performed on the first continuous paper piece Sa based on the combination of the first print data B1*a* and the first line-break data B2*a* which is read in the third in the integrated print command 41*c*. When the second-time first printing operation on the first continuous paper piece Sa is completed, the print head 16 performs homeward movement without any further forward movement, and returns to a position at which the previous forward movement is started. That is, the printing operation on the first continuous paper piece Sa ends by movement corresponding to the one second-time reciprocating movement. Next, the print instruction unit 35 controls drive of the first PF motor 22*a* based on the information such as the number of printing pages included in the first print setting command Aa and thus, the first continuous paper piece Sa is transported downstream by the predetermined feed amount Fa.

Next, the print head 16 starts the third-time reciprocating movement and the third-time first printing operation is performed on the first continuous paper piece Sa based on the combination of the first print data B1*a* and the first line-break data B2*a* which is read in the fourth in the integrated print command 41*c*. Next, the print head 16 continues the forward movement and the second-time second printing operation is performed on the second continuous paper piece Sb based on the combination of the second print data B1*b* and the second line-break data B2*b* which is read in the fifth in the integrated print command 41*c*.

When the second-time second printing operation on the second continuous paper piece Sb is completed, the print head 16 performs the homeward movement which is the movement in a direction opposite to the forward movement and returns to a position (position in FIG. 5) on the movement path of the moving body 15 at which the previous forward movement is started. That is, the printing operations on the continuous paper pieces Sa and Sb are completed by the one third-time reciprocating movement. When a new print job is received by the reception unit 32, the printing operation is resumed based on a print command analyzed from the print job.

In the configuration of the present embodiment, which of the first continuous paper piece Sa or the second continuous paper piece Sb is the printing medium is determined by the print setting commands Aa and Ab including information related to a type (glossy paper, common paper, or the like) or a width size of the medium which is the printing target; however, in a case where the type and the width size of the media are the same, the printing medium may be determined based on the number of line breaks. That is, in the case of the present embodiment, the first print command 41*a* and the second print command 41*b*, which are integrated, are compared to each other and the integrated print command 41*c* is produced such that the printing operation of one command which has greater number of line-break data items B2*a* and B2*b* which define the number of line breaks is performed on the first continuous paper piece Sa on the side closer to the print standby position WP.

According to the present embodiment described above, it is possible to achieve the following effects.

(1) For example, in a case where reception of the first print job at the first port 32*a* of the reception unit 32 is concurrently performed with reception of the second print job at the second port 32*b*, the plurality of print jobs are concurrently analyzed in parallel at the plurality of analysis units 33*a* and 33*b* of the control unit 30. As the analysis result, the print command corresponding to scanning on the plurality of media at least once of the print head 16 is produced as the integrated print command 41*c* by the job management unit 34. Therefore, time taken for the analysis of the plurality of print jobs received by the reception unit 32 into the print command varies from the time in the related art in which the print jobs are sequentially analyzed one by one, and it is possible to shorten the time because the plurality of print jobs are integrated and then analyzed. Thus, it is possible to shorten the total printing time in a case where the printing is concurrently performed in parallel on the plurality of continuous paper pieces (medium) Sa and Sb based on the plurality of print jobs received separately.

(2) In a case where the plurality of print jobs are received from the computers 31a and 31b via the corresponding ports 32a and 32b in a state in which the plurality of computers 31a and 31b are independently connected to the plurality of ports 32a and 32b of the reception unit 32, the print jobs are concurrently analyzed in parallel in the analysis units 33a and 33b corresponding to the ports 32a and 32b. The analysis results from the analysis units 33a and 33b is integrated by the job management unit 34 and the print command is produced corresponding to scanning at least once by which the printing on the plurality of continuous paper pieces Sa and Sb is concurrently performed in parallel. Thus, the plurality of print jobs are concurrently received in parallel via the plurality of ports 32a and 32b and are concurrently analyzed in parallel in the plurality of analysis unit 33a and 33b. Therefore, it is possible to easily shorten the total printing time by increasing the number of ports 32a and 32b and the analysis units 33a and 33b.

(3) At the time of printing, when the print head 16 is caused to move to position facing the second continuous paper piece Sb on the side far from the print standby position WP passing the first continuous paper piece Sa on the side close to the print standby position WP, then is caused to repeatedly perform printing operations on the second continuous paper piece Sb a plurality of times by line breaks, and then, is caused to return to the print standby position WP, the time is wasted. That is, the time taken for passing the first continuous paper piece Sa on the side close to the print standby position WP is not used for printing but just passing through and thus, is a wasted time. In the present embodiment, since the printing is performed on the first continuous paper piece Sa based on the first print data B1a which includes more line breaks without passing the first continuous paper piece Sa on the side close to the print standby position WP by moving a relatively short distance, there is no wasted passing time so that the printing is completed within a shorter time. Hence, the configuration contributes to shortening the total printing time taken for a case where the printing is concurrently performed on the plurality of continuous paper pieces (media) Sa and Sb in parallel based on the plurality of print jobs.

(4) In a case where, glossy paper and common paper are transported in parallel when, according to the identification information included in the print setting commands Aa and Ab, a print job which performs printing of a picture, for example, on glossy paper is received, the control unit 30 controls the drive state of the motors 22a, 22b, and 23 and the voltage applied to the piezoelectric element 24 such that the printing is performed on the glossy paper based on the print job. Thus, according to the identification information included in the print setting commands Aa and Ab, since it is possible to perform the printing as desired, it is possible to prevent re-printing due to failure of the printing and it is possible to contribute to shortening the total printing time.

The embodiment described above may be modified as follows.

Figure 6:
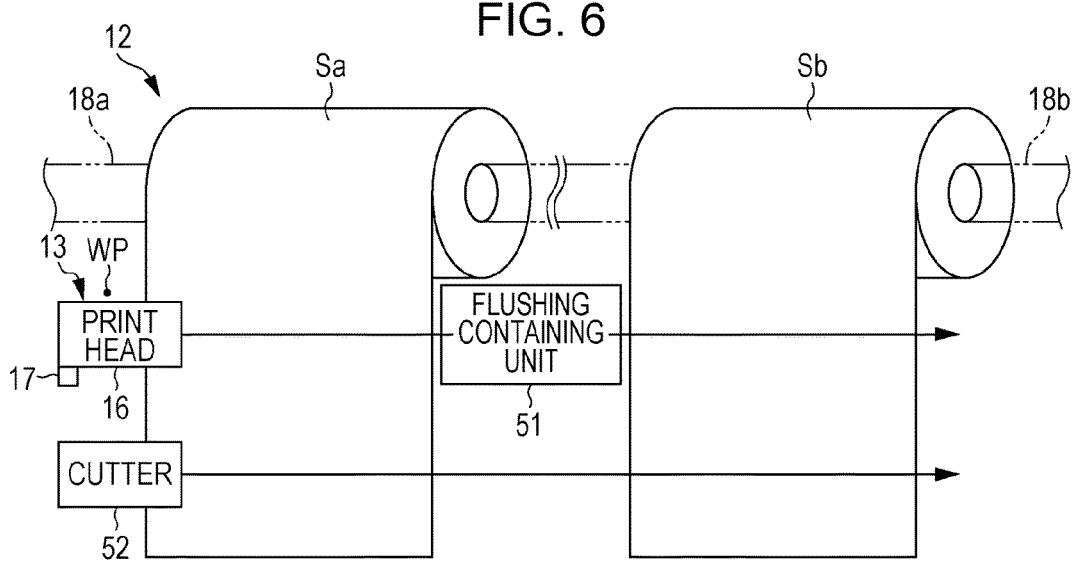
FIG. 6 is a diagram schematically illustrating the printing operation on the plurality of continuous paper pieces by a printing apparatus of a modification example.

As illustrated in FIG. 6, a flushing reception unit 51 that is able to contain ink discharged for emitting from the print head 16 may be provided at a position between transport paths of the first continuous paper piece Sa and the second continuous paper piece Sb which are two adjacent media on the movement path of the print head 16.

According to the configuration, in a case where, in order to maintain good ink ejection characteristics in the print head 16, a so-called flushing which causes the ink to be discharged for emitting is performed during the printing operation based on a control signal independent from the printing from the print head 16, it is possible to suppress an occurrence of the wasted time. That is, during the printing, it is possible for the print head 16 to rapidly move without causing to move a wasteful distance to a position facing the flushing reception unit 51. Thus, in this point, it is possible to contribute to shortening a total printing time in a case where the printing is concurrently performed in parallel on the plurality of continuous paper pieces (media) Sa and Sb based on the plurality of printing jobs.

In addition, as illustrated in FIG. 6, a cutter 52 may be movably provided in a direction traversing the transport paths of the continuous paper pieces Sa and Sb. The continuous paper pieces Sa and Sb may be cut by a predetermined length as necessary.

The identification information included in the print setting commands Aa and Ab may be arbitrarily altered to information including a thickness, color, or the like of the medium other than the type or the width size of the medium which is the printing target.

The first printing operation having more number of the line breaks is performed on the second continuous paper piece Sb on the side far from the print standby position WP and the second printing operation having less number of the line breaks may be performed on the first continuous paper piece Sa on the side close to the print standby position WP.

The number of ports which is included in the reception unit 32 of the control unit 30 may be three or more other than the two first port 32a and second port 32b. In this case, it is preferable that the number of analysis units may be provided corresponding to the number of the ports.

The integrated print command 41c is produced as the print command corresponding to scanning at least once based on the line-break data items B2a and B2b in which the plurality of print commands (in the embodiment, first print command 41a and the second print command 41b) are included in the print control commands Ba and Bb. Therefore, in the embodiment, the print commands corresponding to scanning three times in the reciprocating movement three times of a case where the print head 16 reciprocates three times; however, as long as there is at least scanning once, the number of scanning is not limited to three times. Further, in a case where ink is ejected and the printing operation is performed even when the print head 16 performs the homeward movement, the print command is produced so as to define also the print content corresponding to scanning once in the homeward movement.

According to the embodiment described above, the printer 11 may be a liquid ejecting apparatus that ejects or discharges a liquid other than ink. The examples of states of liquids which are discharged from the liquid ejecting apparatus as a minute amount of a droplet include a granular shape, a tear shape, and filamentous shape with a tail. In addition, here, a liquid means a material which can be ejected from the liquid ejecting apparatus. For example, examples to the liquid include a substance having a state of a liquid phase, a liquid material in high-viscosity or in low-viscosity, sol, gel water, and other fluidal bodies such as a inorganic solvent, an organic solvent, a solution, a liquid resin, a liquid metal (metal melt). In addition, in addition to a liquid as one state of matter, dissolved, dispersed, or mixed particles of functional substances formed by solids such as pigment or metal particles in a solvent are used. Typical examples of the liquid include ink as described in the embodiment described above or liquid crystal. Here, examples of ink include common water-based ink, oil-based ink, and various liquid compositions such as gel ink or hot melt ink.

The entire disclosure of Japanese Patent Application No. 2014-061386, filed Mar. 25, 2014 is expressly incorporated by reference herein.

What is claimed is:

1. A printing apparatus comprising:
a transport unit that is able to arrange and to transport a plurality of media in parallel;
a printing unit that is configured to be able to reciprocate in a direction intersecting with a transport direction of the plurality of media and to perform printing on the plurality of media separately;
a reception unit comprising a plurality of ports, the reception unit is able to receive a plurality of separate print jobs in parallel from one or more sources through the plurality of ports; and
a control unit that controls operations of the transport unit and the printing unit based on the plurality of separate print jobs received by the reception unit, the plurality of separate print jobs being analyzed concurrently in parallel by the control unit, a first print job of the plurality of separate print jobs being a print job for a first one of the plurality of media and a second print job of the plurality of separate print jobs being a print job for a second one of the plurality of media.

2. A printing apparatus comprising:
a transport unit that is able to arrange and to transport a plurality of media in parallel;
a printing unit that is configured to be able to reciprocate in a direction intersecting with a transport direction of the plurality of media and to perform printing on the plurality of media separately;
a reception unit comprising a plurality of ports, the reception unit is able to receive a plurality of separate print jobs in parallel from one or more sources through the plurality of ports; and
a control unit that integrates and analyzes the plurality of separate print jobs received by the reception unit such that a print command is produced corresponding to scanning over the plurality of media at least once by the printing unit and controls operations of the transport unit and the printing unit based on the print command, the plurality of separate print jobs being analyzed concurrently in parallel.

3. The printing apparatus according to claim 2,
wherein the reception unit has the plurality of ports through which the print job can be independently received, and
wherein the control unit has analysis units that are able to analyze the print job into the print command, corresponding to the plurality of ports, and a job management unit that is able to integrate analysis results by a plurality of the analysis units corresponding to the ports, respectively, and to produce a print command corresponding to scanning at least once.

4. The printing apparatus according to claim 2,
wherein the print command includes print data representing print content for each of the plurality of media and line-break data associated with the print data, and
wherein the control unit controls operations of the transport unit and the printing unit such that printing is performed on a medium positioned on a side closer to a print standby position, of the plurality of media, in a movement direction of the printing unit, based on print data which has more line breaks by the line-break data associated with the print data of the plurality of items of print data.

5. The printing apparatus according to claim 2,
wherein a flushing reception unit that is able to contain a liquid discharged for emitting from the printing unit is provided at a position between two adjacent transport paths of the media on the movement path of the printing unit.

6. The printing apparatus according to claim 2,
wherein the print job includes a plurality of items of information including identification information of the medium, and
wherein the control unit controls operations of the transport unit and the printing unit such that printing is performed on a medium which is identified by the identification information of the medium of the plurality of media based on a print job including the identification information of the medium.

7. The printing apparatus according to claim 2, wherein the print command is configured to include a print setting command, a print control command and a print ending command.

8. The printing apparatus according to claim 7, further comprising a job management unit configured to produce a print command corresponding to scanning a portion of the plurality of media at least once by the printing unit.

9. The printing apparatus according to claim 8, where the print command is produced by integrating the print control command and print ending command.

10. The printing apparatus according to claim 7, wherein the print setting command includes media identification information that identifies a medium of the plurality of media transported in parallel to which the printing unit performs printing.

11. The printing apparatus according to claim 9, wherein the media identification information comprises a type of the medium or a width size of the medium.

* * * * *